United States Patent [19]

Stoll

[11] Patent Number: 4,877,058
[45] Date of Patent: Oct. 31, 1989

[54] SPOOL VALVE

[75] Inventor: Kurt Stoll, Esslingen, Fed. Rep. of Germany

[73] Assignee: Festo KG, Esslingen, Fed. Rep. of Germany

[21] Appl. No.: 246,700

[22] Filed: Sep. 20, 1988

[30] Foreign Application Priority Data

Oct. 9, 1987 [DE] Fed. Rep. of Germany ....... 3734136

[51] Int. Cl.⁴ .................... F15B 13/042; F16K 31/126
[52] U.S. Cl. ............................ 137/625.48; 137/625.66; 251/31; 251/61
[58] Field of Search ...................... 137/625.48, 625.66; 251/61, 31

[56] References Cited

U.S. PATENT DOCUMENTS

| 3,398,764 | 8/1968 | Herion | 137/625.64 X |
| 3,773,082 | 11/1973 | Davis | 137/625.48 |
| 3,794,075 | 2/1974 | Stoll et al. | 137/625.66 |
| 4,114,650 | 9/1978 | Gordon | 137/625.66 X |
| 4,138,089 | 2/1979 | McCarthy | 137/625.48 X |
| 4,524,807 | 6/1985 | Toliusis | 137/884 |

FOREIGN PATENT DOCUMENTS

| 2520326 | 11/1976 | Fed. Rep. of Germany | 137/625.66 |
| 454757 | 2/1950 | Italy | 251/61 |
| 146971 | 8/1985 | Japan | 137/625.66 |
| 388135 | 10/1973 | U.S.S.R. | 137/625.66 |
| 718793 | 11/1954 | United Kingdom | 137/625.66 |

Primary Examiner—Gerald A. Michalsky
Attorney, Agent, or Firm—McGlew and Tuttle

[57] ABSTRACT

A valve comprises a connection plate attached to the housing, such plate having a sealing surface facing into such housing, a flat spool arranged to be able to be reciprocated in a direction parallel to such sealing surface so as to sealingly wipe said surface and to connect together and separate from each other ports opening into said surface, said ports being at the ends of ducts extending through said plate, and means for operating said spool by reciprocating same, said operating means taking the form of wall means defining operating spaces at the ends of the spool, means for passing an operating fluid into said spaces for changing the volume thereof so that when the volume of one space is increased the volume of the other is decreased, said wall means being at least in part secured to said housing, said operating means further defining two operating surfaces at the two ends of said spool, said operating surfaces and said wall means part secured to said housing being connected together by at least one flexible part of such wall means, such flexible part allowing the change in volume to take place by a deformation thereof.

13 Claims, 2 Drawing Sheets

SPOOL VALVE

BACKGROUND OF THE INVENTION.

The invention relates to a spool valve comprising a valve housing with a connection port plate arranged therein or thereon and having a flat sealing surface facing into the interior of valve housing, a flat spool arranged on the sealing surface with which it makes sealing contact and which is able to be reciprocated parallel thereto between positions in which it respectively separates and joins together pressure fluid ducts opening into the sealing surface in the connection port plate, and drive means for said flat spool, such drive means having two operating surfaces facing in opposite directions of spool motion, such surfaces being on means connected with said flat spool and which are able to be acted upon by a driving fluid and are formed as part of the inner wall surface of an operating space with a variable volume, such wall being at least partly connected with the housing.

Such spool valves are finding an ever increasing field of application since they are characterized by a low wear rate and are appreciated because of their particularly sturdy design and long working life owing to the absence of so-called soft seals in the moving spool and it is in fact possible for the seal to be arranged as a surface seal on the connection plate. However there are some problems in connection with the operation of the valve, that is to say with the drive for causing the translatory displacement of the flat spool since so far the spool has been conventionally connected by way of a rod or the like extending in the direction of displacement with two secondary pistons, which are able to slide in bores in the housing and which each have an acting operating acted upon by the fluid under pressure. The O-rings or other sealing rings needed for the secondary pistons have turned out to have a high wear rate and frequently leakage occurs which interferes with the function of the valves. A further point is that the production of the spool drive is very involved and high in price and that furthermore the switching times possible with such a valve are relatively long owing to the mass of the secondary pistons.

SHORT SUMMARY OF THE PRESENT INVENTION.

Accordingly one object of the present invention is to create a spool valve of the type specified initially herein which is able to be produced at a lower price owing to simplification of the drive.

A further aim of the invention is to reduce the wear rate.

Yet another objective of the invention is to devise such a valve which avoids leakage from its drive system.

Another aim of the invention is to reduce the switching times of the valve.

In order to achieve these or other objects appearing from the present specification, claims and drawings, each respective operating surface is connected with a wall part, secured to the housing, of the operating space by at least one flexible wall section in such a manner that the change in the volume of the operating space is allowed for by a deformation or change in configuration of this wall section. As a result the flat spool drive is made entirely without any piston at all so that it is possible to dispense with a seal therefor. In the invention each respective operating space is defined by an integral wall and the mobility of the individual operating surfaces is made possible by having a flexible wall section. The operating space is practically in the interior of a thin-walled hollow body, whose volume may be changed by inflation and venting. Owing to the reduced mass shorter switching times are possible as well. Furthermore the invention puts an end to seal leakage problems, since with the exception of a connection port opening into the operating space for the operating fluid under pressure there are no other ports to be sealed off. Since there is no friction in the drive in accordance with the invention, there is no necessity for lubrication and this reduces the costs of servicing the valve in accordance with the invention. A further point is that even if the valve is not operated for a long period of time its ability to function is not impaired, since there is no chance of seals sticking in position as has often been the case with seals on secondary pistons of the type used so far. Furthermore the walls of the hollow bodies defining the operating spaces may be produced at a low price, as for instance by injection molding.

The flat spool drive of the spool valve in accordance with the invention is furthermore characterized by a small number of components and compact dimensions.

Advantageous further developments of the invention are defined in the claims.

Preferably the boundary of the operating surface is completely surrounded by the flexible wall section at its edge so that steady motion of the spool is ensured.

The flexibility of the wall section may for instance be provided for by making the wall of the respective operating space where such wall is flexible, of rubber or of a material with the elastic properties of rubber. Preferably the flexible wall section is formed by wall of a bellows, which more especially has one or a plurality of folds so that the change in the operating volume is less brought about by stretch of the wall than owing to a change in the configuration of the bellows as part of a folding or unfolding motion. This leads to the advantage of a lower degree of stress in the wall of the operating space.

If the operating space is in the interior of a separate hollow body arranged in the valve housing it is then possible for the valve drive to be made at a particularly low price. The hollow bodies or the bellows may be separately produced and then secured in the interior of the valve housing, as for instance by bonding. Moreover, the wall of the operating space may also be formed by part of the valve housing itself.

The operating surface is preferably at least in part constituted by the flexible wall section or in other words the flexible wall section merges with the flexible wall section.

In order to enhance the sealing effect in the zone where the flat spool runs on the surface of the connection plate the spool is preferably provided with means for loading it and pressing it onto the surface of the connection plate. For this purpose it is possible to have a spool space accommodating the flat spool in the valve housing between the two walls containing the two operating spaces so that such spool space may be charged with the operating fluid. This configuration also offers the advantage that wear caused by abrasion where the sealing parts are in engagement with each other is automatically compensated for, because the flexible wall sections of the operating spaces mean that the flat spool is floatingly supported and adjustment to take up wear does not entail an disadvantages for correct functioning of the valve.

The simple design of the spool drive in accordance with the invention further makes it possible for the housing to comprise essentially two parts, that is to say a floor and a cover, the floor conveniently being made in the form of the connection plate to which the housing cover may be detachably secured, for instance by a snap-action detent. In this respect it is more especially an advantage if the valve housing and the walls surrounding the operating spaces are made of a plastic material formed by casting.

The invention will now be described in more detail with reference to the accompanying drawings.

LIST OF THE FIGURES OF THE DRAWING.

Figure 1:
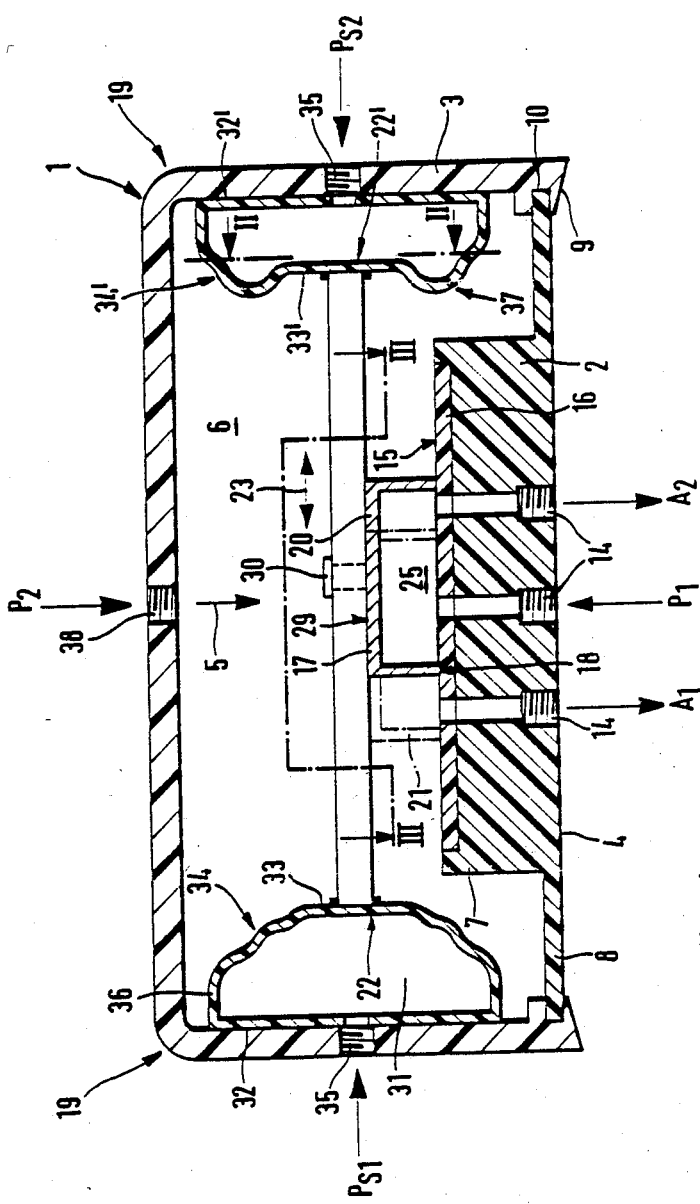
FIG. 1 is a longitudinal section taken through a first working embodiment of the spool valve in accordance with the invention in a simplified form

DETAILED ACCOUNT OF WORKING EXAMPLE OF THE INVENTION.

The illustrated spool valve comprises a valve housing 1, which consists of a floor 2 and a hood-like cover 3 placed thereover. The floor 2 is in the form of a connection plate or connection block 4 which as seen in plan i.e. in the direction marked by the arrow 5, is of rectangular form and has a raised central portion 7 extending into the interior 6 of the housing. The raised portion has a rim 8. The floor of the housing and the cover thereof are made of plastic in the present instance, this permitting low-price manufacture by injection molding and while at the same time facilitating assembly. Thus on the open side of the cover 3 there is a peripheral molded lip 9 with an annular recess 10 into which the rim 8 of the floor 2 may be fitted with a snap action retaining it in place. This makes it possible to dispense with complex screw holding means.

Adjacent to the raised position 7 there is a plurality, in the present case three, of ducts 14 for fluid under pressure extending through raised portion of the connection plate so that pressure lines or the like may be connected with the outer ends of such ducts. The other ends of the ducts 14 are in the form of ports in a sealing surface 15 in the interior 6 of the housing and formed on the raised portion 7. The sealing surface 15 is flat and in the present working example is formed by the surface of a plate-like or rail-like seal 16, which is seated in a suitable recess on the inner side of the raised portion 7 and is for example bonded in place. The seal 16 contains through holes tallying with the ducts 14.

The seal 16 is preferably the only sealing means for ensuring the sealing function of the flat spool 17, which runs on the sealing surface with a sliding fit so that although it may be moved in or parallel to the plane of the sealing surface 16 to and fro, the zones of contact between the spool and the sealing surface swept by the spool are fluid tight. In the present working embodiment of the invention the flat spool 17 is shaped like a trough, that is to say, it has the configuration of a rectangular prism, the one surface of the prism facing the sealing surface 15 being open. The edge 18 of the spool surrounding such open side forms the sealing and sliding part of the spool sweeping the sealing surface 15.

The spool valve in accordance with the invention is equipped with a drive 19 for the flat spool by means of which the flat spool may be caused to reciprocatingly sweep the sealing surface 15 along a straight line. In the present working example of the invention the flat spool may be shifted between two spool settings of which the one is indicated at 20 in full lines and the other is indicated at 21 in broken lines. In each of these two spool settings two respective fluid ducts 14 are linked with each other, in as far as the flat spool 17 simultaneously covers the two corresponding duct ports and thus the puts them in communication with each other via the enclosed spool space 25.

The middle fluid duct 14 may for instance be connected with a source $P_1$ of fluid under pressure, while the two other ducts 14 are for instance connected respectively with a load $A_1$ and $A_2$. Dependent on the specific application the fluid ducts 14 may be placed in circuit in some different way and be connected with each other to provide any desired combination of the ducts by suitably selecting the arrangement of the ports in the connection plate 14 for the various spool settings. In the case of an advantageous form of the invention the design may be such that the ducts which are not connected with others are covered over in a sealing manner by a suitably projecting part of the spool extending towards the interior 6 of the housing.

It is to be noted that the connection plate 4 may also be a part which is separate from the floor, it then being bonded or screwed to the inner side of one surface of the floor.

An account will now be given of the details of the drive 19 of the flat spool.

The floating spool 17 has two operating surfaces 22 and 22' which face in opposite directions on the line 23 of motion of the spool. When there is a differential between the pressures at the two operating surfaces 22 and 22' there will be a displacement of the flat spool 17 in the one or the other direction, the surfaces essentially moving with the flat spool 17. The connection with the spool is in the present form of the invention by way of a rod or bar 24, same extending in the direction of motion as marked by the line 23. At its ends the bar 24 has the operating surfaces 22 and 22' near to the rim 8 of the floor 8. Adjacent to the center of its length the bar 24, which in the present form of the invention has a rectangular cross section, rests on the spool surface 29 opposite to the opening of the spool, it having a pin 30 on the spool extending through it, such pin attaching the flat spool 17 to the bar 24 so as to prevent relative twisting. Other types of attachment are also possible.

For driving the flat spool 17 there is an operating space 31 and 31' for each of the respective operating surfaces 22 and 22', such operating space 31 and 31' further having a section 32 and 32', respectively, secured to the housing and being connected with the between wall sections 33 and 33' forming the operating surfaces 22 and 22', respectively, via a respective flexible wall section 34 and 34'. The operating spaces 31 and 31' have respective connection ports 35 opening into them through which the spaces are able to be supplied with fluid at different respective pressures $P_{S1}$ and $P_{S2}$.

Owing to the provision of the flexible wall sections 34 and 34' the volume of the operating spaces 31 and 31' is able to be varied, an increase in pressure or volume of the one operating space in relation to the other space leading to a displacement of the operating surfaces towards the operating space with the smaller volume.

In the illustrated working example of the invention the respective operating space 31 and 31' is located in the interior of a respective separate hollow body arranged in the valve housing, with the wall section 32 or 32' attached to the housing being parallel to the operating surface and being attached to the inner side of the housing cover 3 axially past the ends of the bar 24 by bonding or some other method. The connection ports 35 extend through this wall section and thus open into the operating space. This form of the invention is particularly simple to produce and assemble. Be this as it may however, it is also possible to so design the hollow body that the wall of thereof its partly formed by the valve housing itself, this not being illustrated.

Figure 2:
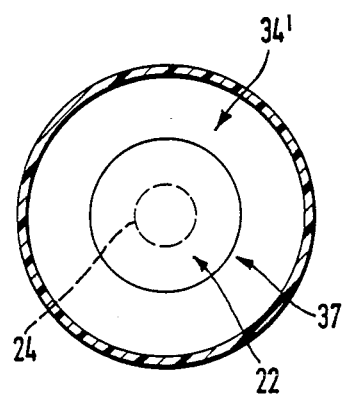
FIG. 2 is a cross section taken on the line II—II of FIG. 1 of the spool valve.
Figure 3:
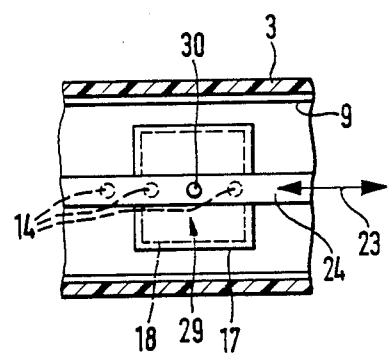
FIG. 3 shows part of the spool valve of FIG. 1 sectioned on the line III—III on a smaller scale.

As will be seen from FIGS. 1 and 2 the operating surface 22 and 22' has its edge completely surrounded by the flexible wall section 34 and 34'; furthermore the part 37 of the surface directed along the axis of the flexible wall section 34 and 34' preferably forms a part of the operating surface as well.

The flexibility of the said wall sections 34 and 34' is made possible in the working example of the invention since the flexible wall section is molded as a bellows wall. In accordance with FIG. 1 it will be seen that there is only one fold 37 designed in such a manner that the operating surface 22 and 22' may snap over from one position into the other (20 and 21) when the pressure differential changes and a certain pressure relationship is moved past. The result is that the arrangement is automatically stabilized in either of the two positions.

In accordance with another form of the invention, not illustrated, the hollow body 36 is in the form of a conventional bellows with a plurality of folds in the part of the hollow body 36 which is circumferential as seen in the direction 23 of displacement.

It is furthermore for the design to be such that the change in volume of the operating spaces 31 and 31' is not only produced by a change in the outer configuration of the operating space wall but rather by making the flexible wall portion of a material with sufficiently rubber-elastic properties to allow it to stretch.

A further advantage of the spool valve in accordance with the invention is due to the fact that as will be seen from FIG. 1 the interior 6 of the housing is able to be connected by a port 38 in the housing cover - or a port at some other position of the housing - with a source $P_2$ of fluid under pressure. As a result a gage pressure will obtain in the interior of the housing which will force the flat spool 17 in the direction of the arrow 5 towards the sealing surface 15. The effectiveness and reliability of the sealing action between the flat spool and the sealing surface wiped thereby is thus further enhanced and at the same time the wear occurring is allowed for by automatic adjustment to take up such wear. This effect is favored additionally by the elastic mounting of the spool in the interior of the housing.

An advantage in the spool valve in accordance with the invention is more especially the fact that the drive of the flat spool 17 takes place free of friction so that furthermore no lubrication is required. There is no need for any precision machining as is normally the case with secondary or servo pistons, or for any lubrication and for separate seals for such servo pistons. For in an advantageous manner the single port provided is the respective connection port 35 for the operating fluid under pressure. The hollow body 36 is furthermore readily manufactured without machining, as for instance by molding elastomeric plastic, and since on each operating side there is essentially only one component, that is to say this body, the arrangement in accordance with the invention has a very compact overall size. Since furthermore no pistons are required for operation of the flat spool 17, the mass to be moved and thus the moment of inertia is very greatly reduced so that fast switching times may be ensured, such times only being limited by the rate of filling of the operating spaces. Switching takes place in a very precise manner, since there is no loss of operating fluid in the flat spool servo drive 19 owing to leakage.

What is claimed:

1. A valve comprising:
 a valve housing having opposite wall portions;
 a connection plate having a sealing surface, the connection plate being attached to said housing with the sealing surface facing into said housing;
 ducts extending through said connection plate;
 ports at the ends of respective ducts and opening into said sealing surface;
 a flat spool having opposite ends mounted for reciprocation along an axis parallel to said sealing surface passing through said opposite wall portions and said opposite ends so as to slide across said surface, connecting together and isolating selected of said ports from each other;
 means for effecting said reciprocation of said spool comprising:
 a pair of bellows in the housing connected between respective opposite ends of the spool and said opposite wall portions, providing operating surfaces attached to the spool in all reciprocal positions thereof;
 means for supplying an operating fluid to each of said bellows for expanding one bellows while contracting the other thereby effecting reciprocation of the spool, the spool being suspended by the attachment to the bellows for float thereof laterally of the axis of reciprocation; and,
 biassing means urging the flat spool against the sealing surface in all reciprocal positions thereof.

2. The valve as claimed in claim 1 wherein said pair of bellows is formed of material with rubber-elastic properties.

3. The valve as claimed in claim 1 wherein the operating surfaces are at least partly formed by the pair of bellows.

4. The valve as claimed in claim 1 comprising means defining a spool space in the valve housing between the two operating surfaces within the pair of bellows and duct means for admitting operating fluid at a given pressure into such spaces for operation of such spool.

5. The valve as claimed in claim 1 wherein the said housing comprises a floor and a cover, such floor being formed by said connection plate, said floor being detachably secured to said cover.

6. The valve as claimed in claim 5 wherein said cover is attached to said floor by clip detent means.

7. The valve as claimed in claim 1 wherein said valve housing is made of resin material.

8. A valve according to claim 1 wherein the valve housing provides a single chamber enclosing both the valve spool and the bellows.

9. A valve comprising:
 a valve housing providing a single chamber with opposite wall portions;

a connection plate having a sealing surface, the connection plate being attached to said housing with the sealing surface facing into said chamber;

ducts extending through said connection plate;

ports at the ends of respective ducts and opening into said sealing surface;

a flat spool having opposite ends mounted in said chamber for reciprocation along an axis parallel to said sealing surface passing through said opposite wall portions and said opposite ends so as to slide across said surface, connecting together and isolating selected of said ports from each other;

means for effecting said reciprocation of said spool comprising:

a pair of bellows in the housing connected between respective opposite ends of the spool and said opposite wall portions, providing operating surfaces attached to the spool in all reciprocal positions thereof; and, means for supplying an operating fluid to each of said bellows for expanding one bellows while contracting the other, thereby effecting reciprocation of the spool, the attachment to the bellows suspending the spool for float thereof laterally of the axis of reciprocation.

10. A valve according to claim 9 wherein the housing comprises a floor and said chamber is provided by a cover including said side wall portions, the floor being formed by said connection plate which is detachably secured to said side wall portions.

11. A valve according to claim 10 wherein the cover is attached to the floor by clip detent means.

12. A valve comprising a housing having a cover member and a base member, the cover member being molded in one piece of plastic material having opposite side walls and end walls outstanding from a base wall providing a chamber, the side walls and end walls having free ends remote from the base wall providing a resiliently flexible continuous free edge portion defining an open end of the cover member;

first and second fluid ports formed in axial alignment with each other in respective opposite side walls and an additional fluid port formed in the cover;

first and second bellows each formed in one piece from elastomeric material with a continuous imperforate wall formed with an inlet at one end, the inlets being intimately secured to respective of said opposite side walls in surrounding relation to respective first and second ports to mount the respective bellows in the cavity, the bellows having imperforate ends remote from the respective inlets extending inwardly of the cover for expansion along an axis of reciprocation extending between said opposite side walls;

a spool having opposite ends aligned in the axial direction and a sealing surface extending between said ends;

said opposite ends being respectively attached directly to respective imperforate ends of respective bellows thereby to mount the spool in the cavity suspended between the bellows with the sealing surface extending towards the open end;

the base member comprising a connection plate formed with a sealing surface, a series of ducts extending transversely through said plate, and ports terminating respective ducts at the sealing surface of the connection plate;

a resiliently flexible attachment means being integrally formed extending continuously around the free edge portion of the cover, peripheral edges of the connection plate being receivable as a sealing fit by a snap action with said attachment means by pressing the connection plate against the free end of the cover thereby to seal the cover in fluid tight condition and to mount the sealing surface of the connection plate in sealing engagement against the sealing surface of the spool with the sealing surface of the connection plate extending along the axis of reciprocation;

whereby fluid supplied through the first and second ports into the respective inlets of the bellows to inflate and deflate the bellows causes reciprocal movement of the spool sealing surface along the connection plate sealing surface joining and isolating selected ones of the connection plate ports; the attachment of the spool to the bellows suspending the spool for float laterally of the axis of reciprocation and, fluid supplied to the additional cover port urging the sealing surface of the spool into sealing engagement with the sealing surface of the connection plate.

13. A valve according to claim 12 wherein the bellows are secured to the opposite side walls by bonding.

* * * * *